United States Patent [19]

Stenglein

[11] Patent Number: 4,768,994
[45] Date of Patent: Sep. 6, 1988

[54] TELESCOPIC TRIPOT UNIVERSAL JOINT

[75] Inventor: Paul R. Stenglein, Frankenmuth, Mich.

[73] Assignee: General Motors Corporation, Detroit, Mich.

[21] Appl. No.: 45,466

[22] Filed: May 4, 1987

[51] Int. Cl.⁴ .............................................. F16D 3/30
[52] U.S. Cl. .................................. 464/111; 464/168; 464/905
[58] Field of Search .................. 384/44; 464/111, 122, 464/123, 124, 167, 168, 905

[56] References Cited

U.S. PATENT DOCUMENTS

| 1,508,653 | 9/1924 | Flick | 464/124 |
|-----------|--------|-------|---------|
| 4,192,154 | 3/1980 | Nakamura et al. | 464/111 |
| 4,320,632 | 3/1982 | Dore | 464/111 |
| 4,490,126 | 12/1984 | Orain | 464/111 |
| 4,516,957 | 5/1985 | Chyz et al. | 464/111 |
| 4,540,384 | 9/1985 | Bennett et al. | 464/111 |

FOREIGN PATENT DOCUMENTS

| 1339932 | 9/1963 | France | 464/168 |
|---------|--------|--------|---------|
| 59-40016 | 3/1984 | Japan | 464/111 |
| 736676 | 6/1966 | Canada | 464/168 |
| 2176871 | 1/1987 | United Kingdom | 464/111 |

Primary Examiner—Daniel P. Stodola
Attorney, Agent, or Firm—F. J. Fodale

[57] ABSTRACT

A telescopic tripot universal joint comprises an inner drive member which has three radial trunnions, an outer drive member which has three radial drive channels and three drive assemblies which comprise drive blocks, bearing rollers and cage structure to retain the bearing rollers which is attached to the drive block in a fixed relationship. The radial trunnions have outer radial projections which are disposed in outer radial grooves of the radial drive channels and engage radial walls in the member and prevent the drive assemblies from engaging or bottoming out on an inner end wall of the outer drive member.

7 Claims, 1 Drawing Sheet

TELESCOPIC TRIPOT UNIVERSAL JOINT

BACKGROUND OF THE INVENTION

This invention relates generally to telescopic universal joints and more particularly to stroking type tripot universal joints employed in automotive vehicle axle drive shafts and especially in front-wheel drive vehicles between the transaxle differential and the driving wheel.

Pending U.S. patent application Ser. No. 846,053 which is assigned to General Motors Corporation discloses a telescopic tripot universal joint which comprises an inner drive member, an outer drive member and three drive assemblies. The inner drive member has three radial trunnions which are spaced substantially 120 degrees from each other around the longitudinal rotational axis of the inner drive member. The outer drive member or housing has three radial drive channels which are spaced substantially 120 degrees from each other around the longitudinal rotational axis of the outer drive member and which are parallel to the longitudinal rotational axis of the outer drive member. The three drive assemblies are pivotally mounted on the three radial trunnions and disposed in the three drive channels.

The drive assemblies comprise drive blocks which carry bearing rollers which engage surfaces of the drive channels to transmit torque via the drive blocks. The bearing rollers are retained by cage means which are attached to the drive block in a fixed relationship.

There is a need in telescopic tripot universal joints of this type to limit the stroke of the inner drive member in the outer drive member in a manner which avoids any possibility of damage to the drive assemblies particularly the bearing rollers and cage means for retaining the bearing rollers.

SUMMARY OF THE INVENTION

The object of this invention is to provide a telescopic tripot universal joint of the above noted type which has means to limit the stroke of the inner drive member in a manner which avoids the possibility of damage to the drive assemblies particularly the bearing rollers and cage means for retaining the bearing rollers.

Another object of the invention is to provide a telescopic tripot universal joint of the above noted type which has means to limit the stroke of the inner drive member which is particularly well suited for use with drive assemblies which have recirculating bearing rollers disposed on an endless or continuous roller track of the drive block.

A feature of the invention is that the means to limit the stroke of one drive member with respect to the other drive member comprises cooperating portions of the drive members which are spaced from the drive assemblies in the radial direction.

Another feature of the invention is that the means to limit the stroke of one drive member with respect to the other drive member prevents the drive assemblies which are mounted on the trunnions of one drive member from engaging or bottoming out on the other drive member.

Another feature of the invention is that the radial trunnions have radial projections which are disposed in radial grooves in the radial drive channels which end short of the drive channels in the longitudinal direction to limit the stroke of the drive member carrying the drive assemblies while preventing any engagement of the drive assemblies with the other drive member at the stroke limit thus avoiding any possibility of damage to the drive assemblies even when recirculating bearing rollers are used.

Another feature of the invention is that radial projections of the radial trunnions are spaced from the longitudinal walls of the radial grooves when the telescopic tripot universal joint is at zero angle (i.e. when the longitudinal axes of the inner and the outer drive members coincide) to permit orbiting of the center of one drive member about the joint center during operation of the universal joint at an angle.

Another feature of the invention is that the radial projections have rounded termini which are spaced from the longitudinal walls of the radial grooves in the drive channels in the radial direction when the telescopic tripot universal joint is at zero angle and the radial grooves in the drive channels are larger than the radial projections in the circumferential direction so that the center of one drive member is free to orbit about the joint center during operation of the tripot universal joint at an angle.

BRIEF DESCRIPTION OF THE DRAWINGS

Other objects and features of the invention will become apparent to those skilled in the art as the disclosure is made in the following detailed description of a preferred embodiment of the invention as illustrated in° the accompanying sheets of drawing in which.

DETAILED DESCRIPTION OF THE PREFERRED EMBODIMENT

Figure 1:
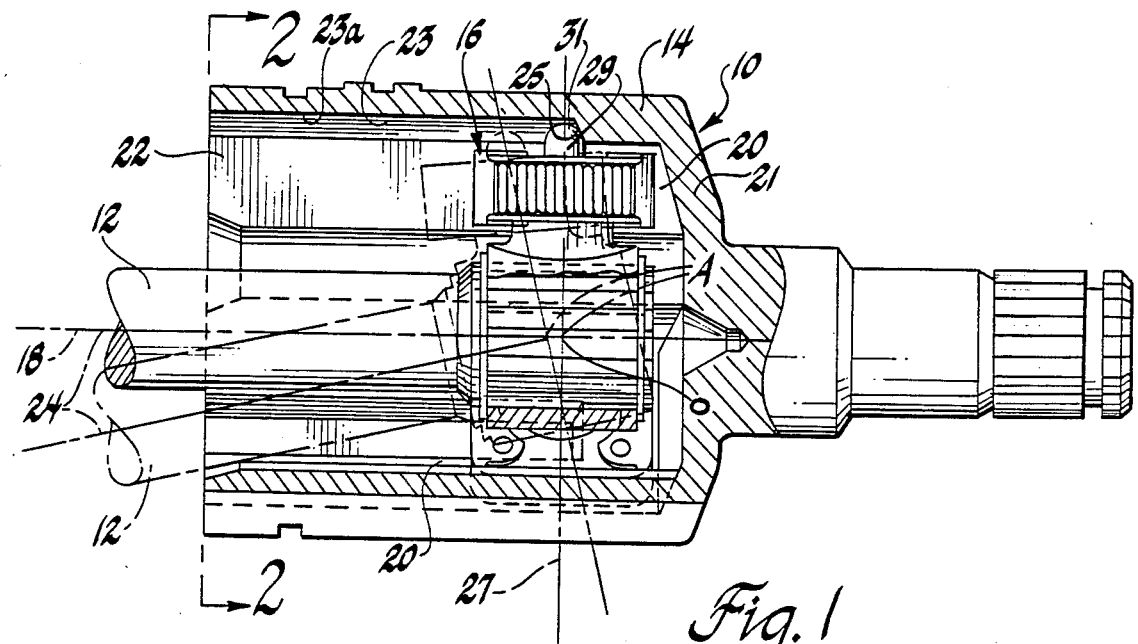
FIG. 1 is a longitudinal section of a telescopic tripot universal joint in accordance with the invention.

Referring now to the drawing, the invention is illustrated in conjunction with a telescopic tripot universal joint 10 which comprises an inner drive member 12, an outer drive member 14 and a plurality of intermediate drive assemblies 16.

The outer drive member 14 has a longitudinal axis 18 about which it rotated and three radial drive channels 20 which are equally spaced at substantially 120 degrees from each other and which extend inwardly to an end wall 21 of the outer drive member 14. Each radial drive channel 20 includes two radially extending, planar surfaces 22 which are parallel to each other and parallel to the longitudinal axis 18. Each radial drive channel 20 further includes an outer radial groove 23 which is also parallel to the longitudinal axis 18 and which ends short of the radial drive channel 20 at an end wall 25 which is spaced from the end wall 21 of the outer drive member 14 in the longitudinal direction.

The inner drive member 12 has a longitudinal axis 24 about which it rotates. The longitudinal axes 18 and 24 coincide when the tripot universal joint 10 is at zero angle as shown in solid lines in FIG. 1 and intersect at a joint center 0 when the tripot universal joint is articulated or bent at an angle as shown in phantom lines in FIG. 1.

Figure 3:
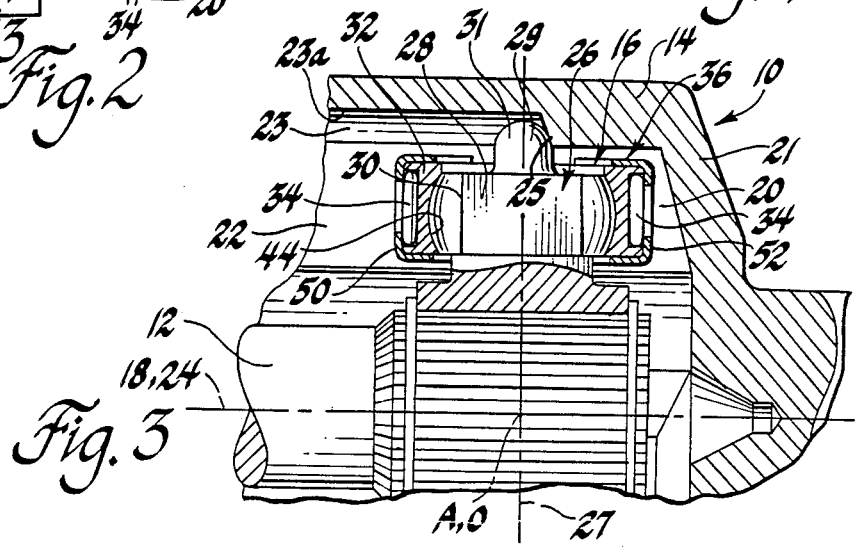
FIG. 3 is an enlarged longitudinal fragmentary section of the telescopic tripot universal joint taken substantially along the line 3—3 of FIG. 2 looking in the direction of the arrows.

The inner drive member 12 has three radial trunnions 26 equally spaced at substantially 120 degrees from each other on coplanar radial axes 27 which intersect the longitudinal axis 24 perpendicularly at a center A. The center A of the inner drive member 12 is displaced from the longitudinal axis 18 of the outer drive member 14 and orbits around the joint center 0 at three times the joint speed when the tripot universal joint 10 is articulated and rotated at a given speed. The radial trunnions 26 comprise truncated spherical or ball-like portions which have been truncated to provide spherical bearing surfaces 28 in the longitudinal direction of the inner drive member 12 and flat surfaces 30 which are perpendicular to the longitudinal axis 24 as best shown in FIG. 3. The flat surfaces 30 are provided for assembly purposes as explained below.

Figure 2:
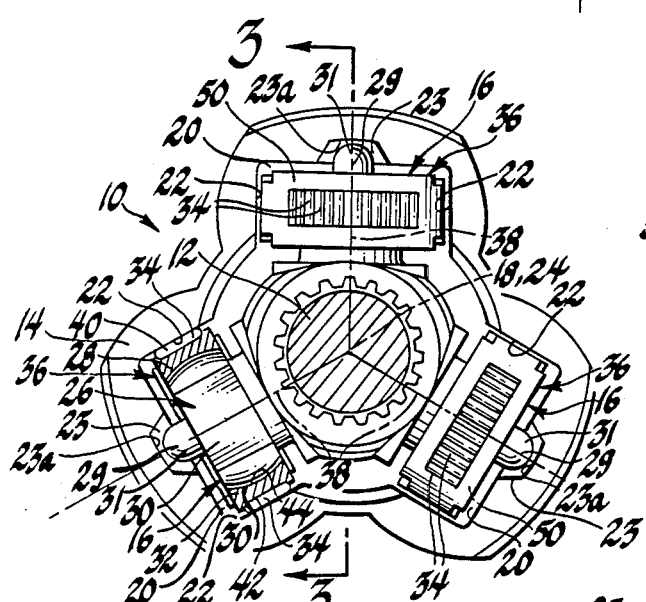
FIG. 2 is an end view taken substantially along the line 2—2 of FIG. 1 looking in the direction of the arrows.

Each radial trunnion 26 further comprises a concentric radial projection 29 which projects outwardly of the ball-like portion and has a rounded terminus 31. The radial trunnions 26 are disposed in the respective radial drive channels 20 so that the spherical bearing surfaces 28 are in confronting relation with the planar surfaces 22 of the respective radial drive channels 20 and the concentric radial projections 29 are disposed in the respective outer radial grooves 23 as shown in FIGS. 1, 2 and 3.

The three drive assemblies 16 are disposed in the respective radial drive channels 20 and pivotally mounted on the respective radial trunnions 26. Each drive assembly 16 comprises a drive block 32, a plurality of bearing rollers 34, and cage means 36 for retaining the bearing rollers 34.

The drive block 32 has a continuous or endless roller track 40 which circumscribes an imaginary radial centerline 38 in parallel fashion. The continuous roller track 40 includes two planar surfaces 42 which are parallel to each other and the radial centerline 38 and which are disposed parallel to and facing the planar surfaces 22 of the radial drive channel 20 in which the drive block 32 is disposed. The drive block 32 also has a concentric spherical socket 44 which fits onto the spherical bearing surfaces 28 of the radial trunnion 26 whereby the drive block 32 is pivotally mounted on the radial trunnion 26 disposed in the radial drive channel 20 in which the drive block 32 is disposed.

A full complement of bearing rollers 34 is disposed on the continuous roller track 40 so that a number of bearing rollers 34 are disposed between the planar surfaces 42 of the drive block 32 and the planar surfaces 22 of the radial drive channel 20 in which the drive block 32 is disposed.

The roller cage means 36 is carried by the drive block 32 and retains the bearing rollers 34 for rotation about axes which are substantially parallel to the radial centerline 38 of the drive block 32 and engagement with the planar surfaces 22 of the radial drive channel 20 to transfer torque via the drive block 32. In this particular instance the roller cage means 36 comprise upper and lower ledges 46 and 48 of the drive block 32 which retain the bearing rollers 34 in the centerline direction of the drive block 32 and two sheet metal cage pieces 50 and 52 which are attached to the longitudinal ends of the drive block 32.

The sheet metal cage pieces 50 and 52 provide overhanging flanges 54 a the longitudinal ends of the continuous roller track 40 and covers 56 at the corners leading to the two planar surfaces 42. The overhanging flanges 54 and covers 56 retain the bearing rollers 34 in the direction radial of the centerline 38 for the portions of the continuous roller track 40 between the two planar surfaces 42. For the two planar surface portions of the continuous roller track 40, the bearing rollers 34 are retained by grease until the tripot universal joint 10 is assembled whereupon the planar surfaces 22 of the associated radial drive channel 20 retain the bearing rollers 34.

The upper and lower ledges 46 and 48 and the sheet metal cage pieces 50 and 52 are fixedly mounted on the drive block 32 so that the roller cage means 36 is not displaced relative to the drive block 32 during operation of the tripot universal joint 10. The bearing rollers 34 roll along the continuous roller track 40 in the manner of a recirculating roller bearing as the radial trunnions 26 and the drive blocks 32 are displaced relative to the radial drive channels 20 during operation of the tripot universal joint 10.

A slight clearance is provided between the planar surfaces 22 of the radial drive channel 20 and the intermediate drive assembly 16 so that when the joint is stroked axially with torque applied in one direction of rotation, only the active bearing rollers 34 on the torque side of the drive block 32 are under load while rolling in a given direction. Thus, the bearing rollers 34 on the opposite side of the drive block 32 are unloaded and free to travel without interference in the opposite linear direction as they must do since all the bearing rollers 34 in the assembly are part of a recirculating train.

The radial projections 29 of the radial trunnions 26 which are disposed in outer radial grooves 23 of the drive channels 20 engage the end walls 25 to limit the inward plunge of inner drive member 12 to that the drive assemblies 16 cannot engage the end wall 21 of the outer drive member 14 as shown in FIGS. 1 and 3 thus avoiding possible damage during stroking operation. It should also be noted is that radial projections 29 of the radial trunnions 26 are spaced from the longitudinal walls of the outer radial grooves 23 when the when the telescopic tripot universal joint 10 is at zero angle (i.e. when the longitudinal axes 18, 24 of the inner and the outer drive members coincide) to permit orbiting of center A of the inner drive member 12 when the telescopic tripot universal joint 10 is bent at an angle as shown in phantom in FIG. 1 and operated. More particularly, as best shown in FIG. 2, the outer longitudinal or bottom walls 23a of the outer radial grooves 23 are spaced outwardly of the rounded termini 31 of the radial projections 29 and the outer radial grooves 23 are larger then the radial projections 29 in the circumferential direction when the telescopic tripot universal joint 10 is at zero angle so that the center 0 of the inner drive member 12 is free to orbit during operation of the telescopic tripot universal joint at an angle.

Figure 4:
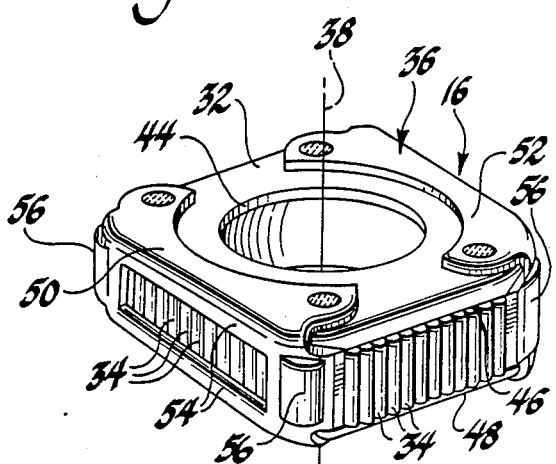
FIG. 4 is a perspective view of a typical drive assembly of the telescopic tripot universal joint shown in FIGS. 1, 2 and 3.

The drive blocks 32, bearing rollers 34 and sheet metal cage pieces 50 and 52 are manufactured as unit handled drive assemblies 16 such as the unit handled drive assembly 16 shown in FIG. 4. The typical drive assembly 16 is mounted on its associated radial trunnion 26 by inserting the spherical bearing surfaces 28 of the radial trunnion 26 into the socket 44 through assembly slots (not shown) and then indexing the the drive assembly 90 degrees so that the spherical bearing surfaces 28 are trapped in the unslotted spherical portions of the socket 44 as shown in FIG. 2 and as more particularly described in the pending U.S. patent application Ser. No. 846,053 which is discussed in the background of this invention.

I wish it to be understood that I do not desire to be limited to the exact details of construction shown and described, for obvious modifications will occur to a person skilled in the art.

The embodiments of the invention in which an exclusive property or privilege is claimed are defined as follows:

1. A telescopic tripot universal joint comprising:
   a first drive member which has a first longitudinal axis and three radial drive channels which are equally spaced at substantially 120 degrees from each other and which extend in the longitudinal direction,
   a second drive member which has a second longitudinal axis and three radial trunnions which are equally spaced at substantially 120 degrees from each other and which are disposed in the respective radial drive channels of the first drive member,
   three drive assemblies which are disposed in the respective radial drive channels and pivotally mounted on the respective radial trunnions and which include a drive block, bearing rollers disposed between the drive block and the radial drive channel in which the drive block is disposed, and cage means for retaining the bearing rollers which is attached to the drive block in a fixed relationship, and
   means to limit the inward stroke of the second drive member with respect to the first drive member which comprises portions of the radial trunnions which are spaced from the drive assemblies in the radial direction and cooperating portions of the first drive member which are also spaced from the drive assemblies in the radial direction.

2. A telescopic tripot universal joint comprising:
   a first drive member which has a first longitudinal axis and three radial drive channels which are equally spaced at substantially 120 degrees from each other and which extend in the longitudinal direction,
   a second drive member which has a second longitudinal axis and three radial trunnions which are equally spaced at substantially 120 degrees from each other and which are disposed in the respective radial drive channels of the first drive member,
   three drive assemblies which are disposed in the respective radial drive channels and pivotally mounted on the respective radial trunnions and which include a drive block, bearing rollers disposed between the drive block and the radial drive channel in which the drive block is disposed, and cage means for retaining the bearing rollers which is attached to the drive block in a fixed relationship, and
   means to limit the inward stroke of the second drive member with respect to the first drive member which comprises a radial groove in each drive channel which ends short of the drive channel in the longitudinal direction and a radial projection on each radial trunnion which is disposed in one of the radial grooves.

3. A telescopic tripot universal joint comprising:
   a first drive member which has a first longitudinal axis and three radial drive channels which are equally spaced at substantially 120 degrees from each other and which extend in the longitudinal direction,
   a second drive member which has a second longitudinal axis and three radial trunnions which are equally spaced at substantially 120 degrees from each other and which are disposed in the respective radial drive channels of the first drive member,
   three drive assemblies which are disposed in the respective radial drive channels and pivotally mounted on the respective radial trunnions and which include a drive block having a continuous roller track, a full complement of bearing rollers disposed on the continuous roller track for recirculation along the continuous roller track, and cage means for retaining the bearing rollers which is attached to the drive block in a fixed relationship, and
   means to limit the stroke of the second drive member with respect to the first drive member in the inward direction which comprises a radial groove in each drive channel which has an end wall which is spaced from an inner end wall of the first drive member in the longitudinal direction and a radial projection on each radial trunnion which is disposed in one of the radial grooves and which engages the end wall of the radial groove in which it is disposed so that the drive assemblies cannot engage the inner end wall of the first drive member.

4. The telescopic tripot universal joint as defined in claim 3 wherein the radial groove in each drive channel has a longitudinal wall and wherein the radial projection on each radial trunnion which is disposed in one of the radial grooves is spaced from the longitudinal wall means of the radial groove in which it is disposed when the tripot universal joint is at zero angle to permit orbiting of the center of the second drive member during operation of the universal joint at a angle.

5. The telescopic tripot universal joint as defined in claim 3 wherein the radial projections have termini which are spaced from the longitudinal walls in the radial direction when the tripot universal joint is at zero angle and the radial grooves in the drive channels are larger then the radial projections in the circumferential direction so that the center of the second drive member is free to orbit during operation of the tripot universal joint at an angle.

6. A telescopic tripot universal joint comprising:
   an outer drive member which has a first longitudinal axis and three radial drive channels which are equally spaced at substantially 120 degrees from each other and which extends in the longitudinal direction,
   an inner drive member which has a second longitudinal axis and three radial trunnions which are equally spaced at substantially 120 degrees from each other and which are disposed in the respective radial drive channels of the outer drive member,
   three drive assemblies which are disposed in the respective radial drive channels and pivotally mounted on the respective radial trunnions and which include a drive block having a continuous roller track, a full complement of bearing rollers disposed on the continuous roller track for recirculation along the continuous roller track, and cage means for retaining the bearing rollers which is attached to the drive block in a fixed relationship, and means to limit the inward stroke of the inner drive member which comprises an outer radial groove in each drive channel which has a longitudinal wall and an end wall which is spaced from an inner end wall of the outer drive member in the longitudinal direction and a radial projection on each radial trunnion which is disposed in one of the outer radial grooves and which engages the end wall of the outer radial groove in which it is disposed so that the drive assemblies cannot engage the inner end wall of the outer drive member, the radial projection on each radial trunnion being spaced from the longitudinal wall of the outer radial groove in which it is disposed when the tripot universal joint is at zero angel to permit orbiting of the center of the inner drive member during operation of the universal joint at an angle.

7. The telescopic tripot universal joint as defined in claim 6 wherein the radial projections have temini which are spaced from the longitudinal walls in the radial direction when the tripot universal joint is at zero angle and the other radial grooves in the drive channels are larger than the radial projections in the circumferential direction so that the center of the inner drive member is free to orbit during operation of the tripot universal joint at an angle.

* * * * *